United States Patent [19]

Fujio et al.

[11] Patent Number: 4,851,315
[45] Date of Patent: Jul. 25, 1989

[54] BISAZO PHOTOCONDUCTIVE FILM AND ELECTROPHOTOGRAPHIC LIGHT-SENSITIVE ELEMENT USING SAME

[75] Inventors: Katsunori Fujio; Setsuo Ishibashi, both of Furukawa, Japan

[73] Assignee: Alps Electric Co., Ltd., Japan

[21] Appl. No.: 170,997

[22] Filed: Mar. 17, 1988

[30] Foreign Application Priority Data

May 15, 1987 [JP] Japan .................... 62-119184

[51] Int. Cl.4 ............................ G03G 5/06
[52] U.S. Cl. ......................... 430/79; 430/76; 430/77; 430/78; 430/58; 430/59; 534/761
[58] Field of Search .................. 430/76, 77, 78, 79; 534/761

[56] References Cited

U.S. PATENT DOCUMENTS

| | | | |
|---|---|---|---|
| 3,121,073 | 2/1964 | Hertel et al. | 534/761 X |
| 4,390,611 | 6/1983 | Ishikawa et al. | 430/78 X |
| 4,396,696 | 8/1983 | Nagasaka et al. | 430/78 |
| 4,495,264 | 1/1985 | Takahashi et al. | 430/76 X |
| 4,610,943 | 9/1986 | Takiguchi et al. | 430/76 |

FOREIGN PATENT DOCUMENTS 61-23155  1/1986  Japan .................... 534/761

*Primary Examiner*—Roland E. Martin
*Attorney, Agent, or Firm*—Guy W. Shoup; Paul J. Winters; Stephen L. Malaska

[57] ABSTRACT

A photoconductive film includes at least one kind of bis-azo pigments and exhibits a high sensitivity. The film may be used as an electrophotographic light-sensitive element.

2 Claims, 2 Drawing Sheets

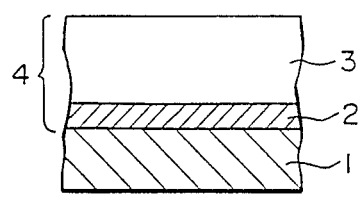
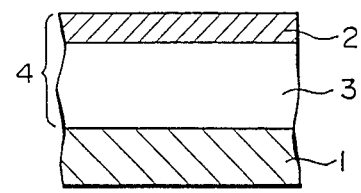
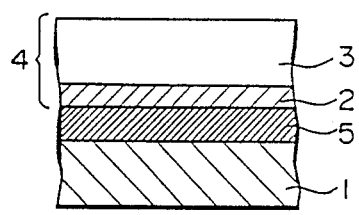
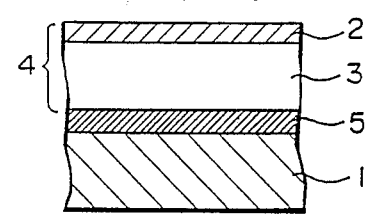
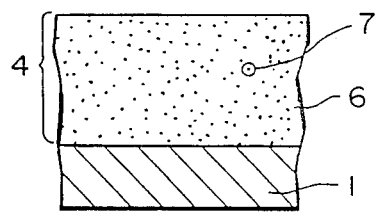
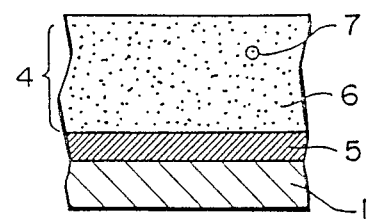

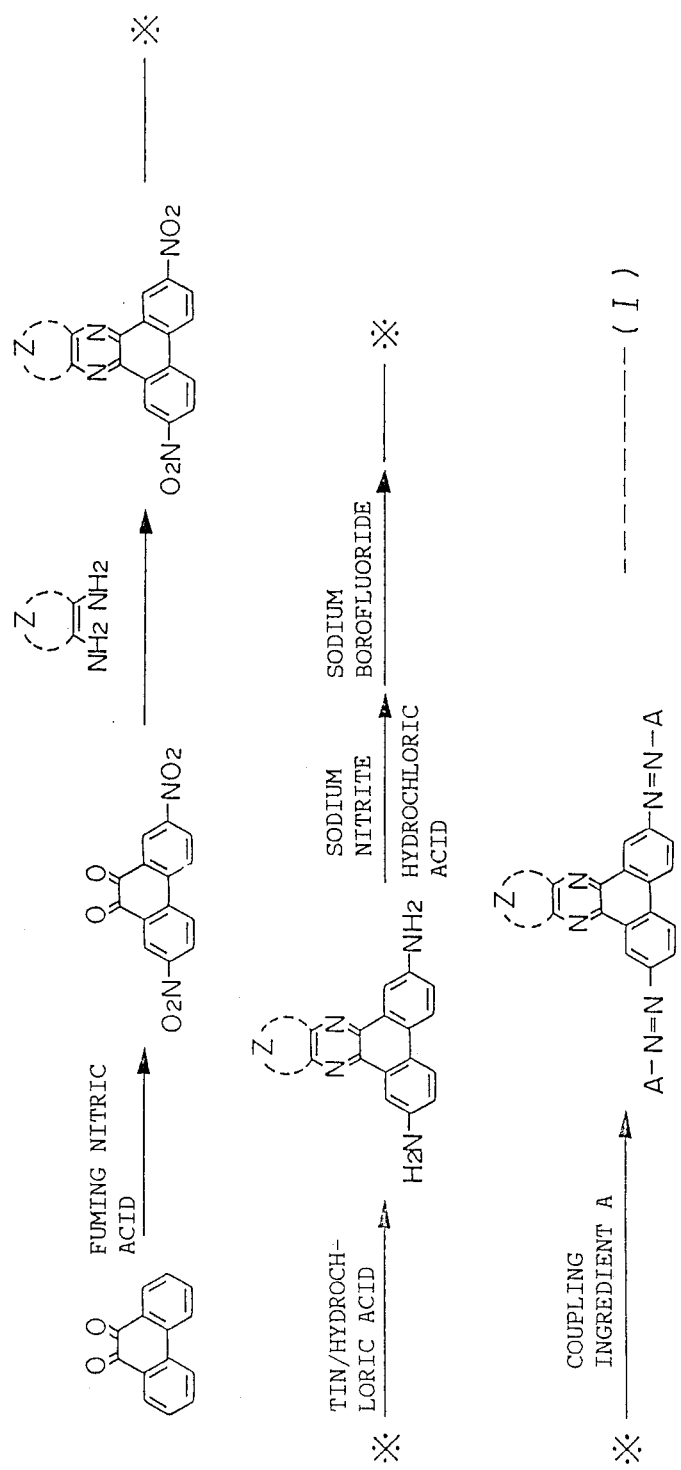

BISAZO PHOTOCONDUCTIVE FILM AND ELECTROPHOTOGRAPHIC LIGHT-SENSITIVE ELEMENT USING SAME

FIELD OF THE INVENTION

This invention relates to a photoconductive film including a novel organic photoconductive compound and relates to an electrophotographic light-sensitive element using the film.

BACKGROUND OF THE INVENTION

Some of widely known electrophotographic light-sensitive elements include a light-sensitive layer primarily comprising selenium, zinc oxide, cadmium sulfide or other inorganic photoconductive compound. However, they are not satisfactory in thermal stability, operating life and other various characteristics. Beside this, they have one or other toxicity which requires a particular attention in manufacturing them.

In contrast, electrophotographic light-sensitive elements having a light-sensitive layer primarily comprising an organic photoconductive compound have many advantages such as easier manufacturing process, less cost, easy handling and excellent thermal stability in most cases as compared to selenium light-sensitive elements, and they arouse a great interest. The most widely known organic photoconductive compound of this sort is poly-N-vinylcarbazole. An electrophotographic light-sensitive element is already used in practice that has a light-sensitive layer primarily comprising a charge-transfer complex made from the foregoing poly-N-vinylcarbazole and 2,4,7-trinitro-9-fluorenone or other Lewis acid.

Some known electrophotographic light-sensitive elements have a separate operation type light-sensitive layer of a multi-layer type or a separate type in which the carrier generating function and the carrier transport function of a photoconductive element are shared by different agents. For example, an electrophotoconductive light-sensitive element is already used in practice that comprises a carrier generating layer in the form of, for example, an amorphous selenium film and a carrier transport layer primarily including poly-N-vinylcarbazole.

Further, some efforts are done to make both a carrier generating agent and a carrier transport agent from organic photoconductive compounds to form an electrophotographic light-sensitive element including the foregoing separate operation type light-sensitive layer. In this case, typical carrier generating agents are azo coloring matter, phthalocyanine coloring matter, anthraquinone coloring matter, perylene coloring matter, cyanine coloring matter, thiapyrylium coloring matter, squaric acid derivative dye, etc. Typical carrier transport agents are amine derivative, oxazole derivative, oxadiazole derivative, triphenylmethane derivative, etc.

When selected carrier generating agent and carrier transport agent do not have a film-forming capacity by themselves, they each are used together with any suitable binding agent to form a film. In these circumstances, some known electrophotographic light-sensitive elements have a layer including a carrier generating agent and a layer including a carrier transport agent which both layers are in the form of multiple layers on a conductive support base. Other known electrophotographic light-sensitive elements have a layer in which a carrier generating agent and a carrier transport agent are dispersed.

However, since these electrophotographic light-sensitive elements using an organic photoconductive compound as a carrier generating agent still have a low sensitivity of the photoconductivity and a short operating life as compared to those using an inorganic photoconductive compound, there are few elements that are acceptable practically.

OBJECT OF THE INVENTION

It is therefore an object of the invention to provide a highly sensitive photoconductive film and an electrophotographic light-sensitive element including the film, using a novel organic photoconductive compound.

SUMMARY OF THE INVENTION

An invention photoconductive film is characterized in the use of at least one of bis-azo pigments shown by the following general formula (1):

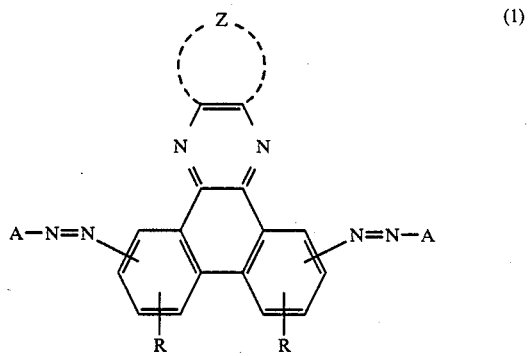

where R is hydrogen atom, lower alkyl group, aryl radical, alkoxycarbonyl group, aryloxycarbonyl group, acyl group, halogen atom or monovalent organic residue; Z is hydrocarbon series condensed and substituted or not substituted with a pyrazine ring or group of atoms necessary for forming a heteroaromatic ring; and

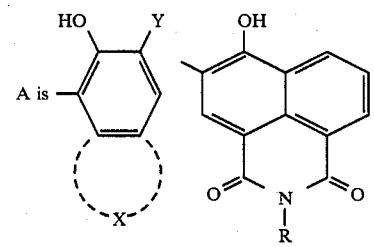

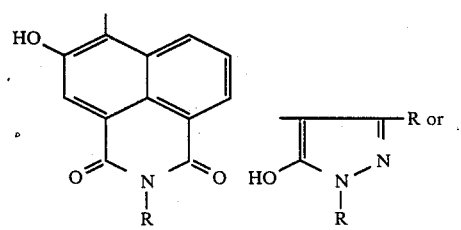

-continued

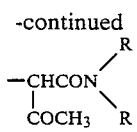

where R is hydrogen atom, lower alkyl group, aryl radical, alkoxycarbonyl group, aryloxycarbonyl group, acyl group, halogen atom or monovalent organic residue; and

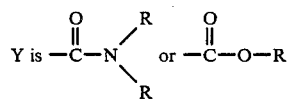

where R is the same as above.

Further, the inventive electrophotographic light-sensitive element is characterized in the use of a light-sensitive layer having a photoconductive film which includes at least one of bis-azo pigments shown by the general formula (1).

Heretofore, no effort was done, using any bis-azo pigment shown by the general formula (1) as an electrophotographic photoconductive compound. In contrast, the present inventors found that electrophotographic light-sensitive elements have excellent sensitivities when using such a pigment as an electrophotographic photoconductive compound, particularly as a carrier generating agent, and the invention is based on the recognition.

Some specific compounds shown by the general formula (1) are shown below.

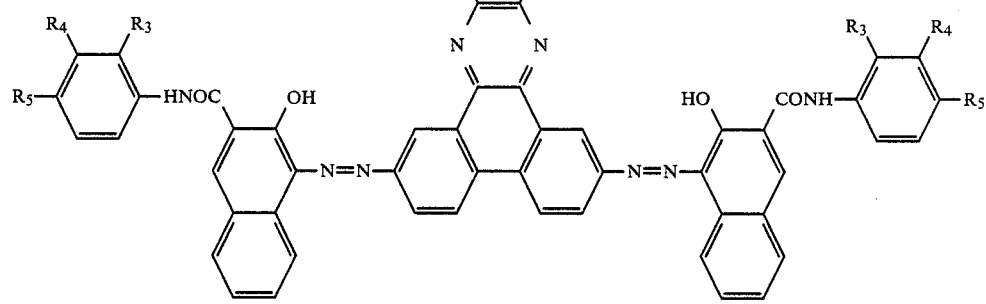

(2)

where R1 through R5 are combined as shown in Table 1.

TABLE 1

| No. | $R_1$ | $R_2$ | $R_3$ | $R_4$ | $R_5$ |
|---|---|---|---|---|---|
| (2)-1 | —H | —H | —H | —H | —H |
| (2)-2 | —H | —H | —Cl | —H | —H |
| (2)-3 | —H | —H | —H | —NO$_2$ | —H |
| (2)-4 | —H | —H | —H | —H | —Cl |
| (2)-5 | —H | —H | —CH$_3$ | —H | —H |
| (2)-6 | —H | —H | —H | —OCH$_3$ | —H |
| (2)-7 | —H | —H | —H | —H | —CH$_3$ |
| (2)-8 | —H | —H | —CF$_3$ | —H | —H |
| (2)-9 | —H | —H | —H | —CF$_3$ | —H |
| (2)-10 | —H | —H | —H | —H | —CF$_3$ |
| (2)-11 | —H | —H | —Cl | —Cl | —H |
| (2)-12 | —H | —H | —H | —Cl | —Cl |
| (2)-13 | —H | —H | —NO$_2$ | —H | —NO$_2$ |
| (2)-14 | —H | —Cl | —H | —H | —H |
| (2)-15 | —H | —NO$_2$ | —H | —H | —H |
| (2)-16 | —H | —OCH$_3$ | —Cl | —H | —H |
| (2)-17 | —H | —N(CH$_3$)$_2$ | —H | —NO$_2$ | —H |
| (2)-18 | —H | —CN | —H | —H | —Cl |
| (2)-19 | —H | —CH$_3$ | —CH$_3$ | —H | —H |
| (2)-20 | —H | —CF$_3$ | —H | —OCH$_3$ | —H |
| (2)-21 | —Cl | —Cl | —H | —H | —CH$_3$ |
| (2)-22 | —CN | —CN | —CF$_3$ | —H | —H |
| (2)-23 | —CH$_3$ | —CH$_3$ | —H | —CF$_3$ | —H |
| (2)-24 | —C$_6$H$_5$ | —C$_6$H$_5$ | —H | —H | —CF$_3$ |

TABLE 1-continued
| No. | R₁ | R₂ | R₃ | R₄ | R₅ |
|---|---|---|---|---|---|
| (2)-25 | 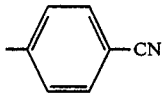 | 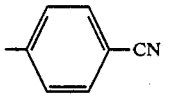 | —Cl | —Cl | —H |
| (2)-26 | 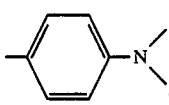 | 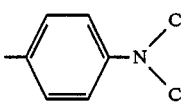 | —H | —Cl | —Cl |
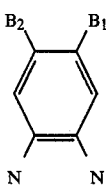
(3)
where B1 through B3 are combined as shown in Table 2.
TABLE 2
| No. | B₁ | B₂ | B₃ |
|---|---|---|---|
| (3)-1 | —H | —H | 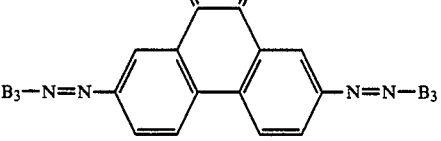 |
| (3)-2 | —H | —H | 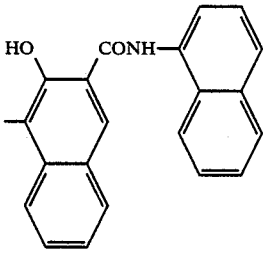 |
| (3)-3 | —H | —H | 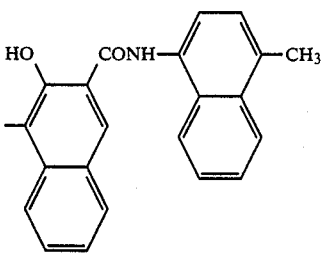 |

TABLE 2-continued
| No. | B₁ | B₂ | B₃ |
|---|---|---|---|
| (3)-4 | —H | —H | 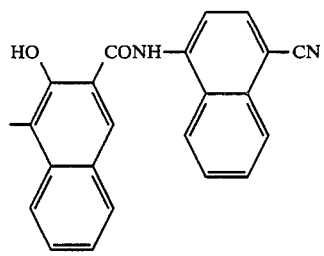 |
| (3)-5 | —H | —H | 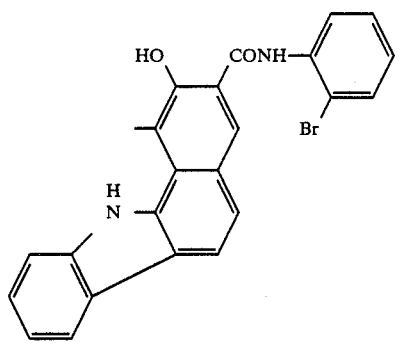 |
| (3)-6 | —H | —H | 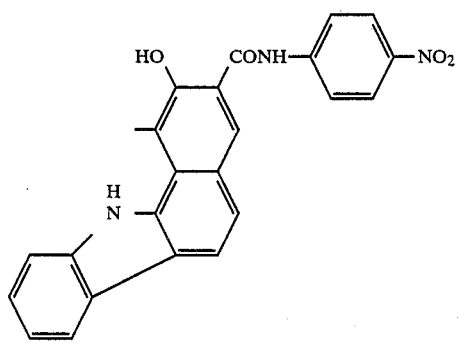 |
| (3)-7 | —H | —H | 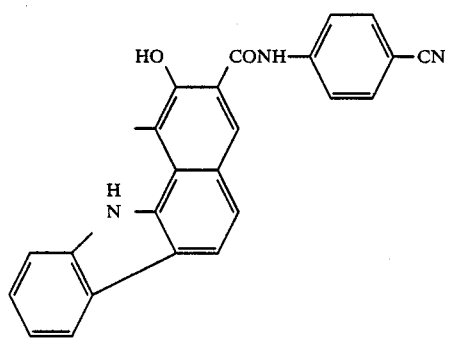 |

TABLE 2-continued
| No. | B₁ | B₂ | B₃ |
|---|---|---|---|
| (3)-8 | —H | —H | 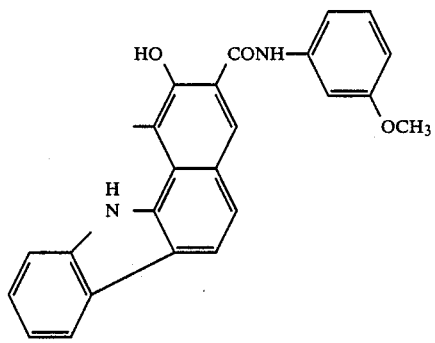 |
| (3)-9 | —CN | —CN | 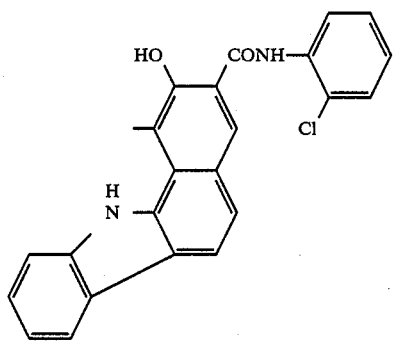 |
| (3)-10 | —CH₃ | —CH₃ | 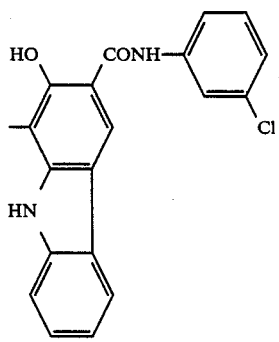 |
| (3)-11 | —OCH₃ | —OCH₃ | 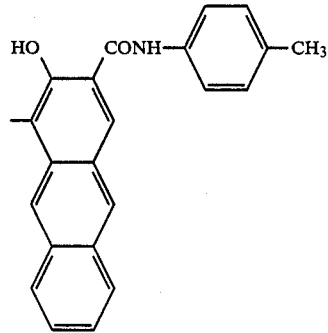 |

TABLE 2-continued

| No. | B₁ | B₂ | B₃ |
|-----|------|------|------|
| (3)-12 | —NO₂ | —NO₂ | (structure: salicylamide with CONH linked to phenyl bearing OCH₃, and dibenzofuran/phenoxy moiety) |

The compound shown by the general formula (1) may be obtained by, for example, a reaction formula (I) in an attached sheet. Symbols in the reaction formula (I) mean the same as those in the general formula (1). Manufacturing processes of such compounds are described in detail in Ber., 35, 3117 (1902) and Ber., 18, 1942 (1885).

The inventive electrophotographic light-sensitive element uses the organic photoconductive compound shown by the general formula (1) as a carrier generating agent, and may be arranged as follows.

As shown in FIG. 1 or 2, a light sensitive layer 4 having a carrier generating layer 2 primarily consisting of a carrier generating agent and a carrier transport layer primarily consisting of a carrier transport agent is provided on a conductive support base 1. FIG. 1 shows an arrangement in which the carrier transport layer 3 is overlaid on the carrier generating layer 2, whereas FIG. 2 shows an arrangement in which the carrier generating layer 2 is overlaid on the carrier transport layer 3.

As shown in FIG. 3 or 4, a similar light-sensitive layer 4 may be provided on the conductive support base 1 via an intermediate layer 5.

As shown in FIG. 5 or 6, a light-sensitive layer 4 made by dispersing fine particles of a carrier generating agent 7 in a layer 6 primarily consisting of a carrier transport agent is provided on the conductive support base 1 directly or via the intermediate layer 5.

The conductive support base 1 may be in the form of a metal plate or in the form of a paper or plastic sheet which is coated, vapor-deposited or laminated with a conductive film of conductive polymer, indium oxide or other conductive compound or alternatively with alminum, paradium, gold or other metal film.

The carrier generating layer 2 may be formed in a process in which the carrier generating agent shown by the general formula (1) is ground into fine particles in a carrier medium by a ball mill, homomixer, sand mill, colloid mill, etc., said compound being subsequently dispersed in a binding agent if necessary so that the resulting dispersed liquid is spread, or in a process in which a solution obtained by solving the carrier generating agent in a binding agent under a solvent is spread in an immersion, spray, spinner or other process.

In this case, the binding agent may be selected from phenolic resin, polyester resin, vinyl acetate resin, polycarbonate resin, polypeptide resin, cellulosic resin, polyvinyl pyrolidone, polyethylene oxide, polyvinyl chloride resin, starch, polyvinyl alcohol, acrylic copolymer resin, methacrylate copolymer resin, silicone resin, polyachrylonitrile copolymer resin, polyachrylamide, polyvinyl butyral, etc.

Further, the carrier generating layer 2 may be formed by vacuum-depositing the compound shown by the general formula (1) into a thin film.

The carrier transport layer 3 may be formed by a solution prepared by dispersing or solving the carrier transport agent in a similar binding agent as indicated above. Although the instant invention does not particularly limit the material of the carrier transport agent, typical agents are amine derivative, oxazole derivative, oxadiazole derivative, triphenylmethane derivate, etc.

The intermediate layer 5 interposed between the conductive support base 1 and the light-sensitive layer 4 has a barrier function and an adhesion function. It may be made from casein, polyvinyl alcohol, nitrocellulose, ethylene-acrylic acid copolymer, polyamide (nylon 6, nylon 66, nylon 610, copolymer nylon, alkoxymethylized nylon, etc.), polyurethane, gelatine, aluminum oxide, etc.

The light-sensitive layer 4 made by dispersing fine particles of the carrier generating agent 7 in the layer 6 primarily consisting of a carrier transport agent may be formed by dispersing or solving the carrier transport agent in a binding agent as indicated above, further dispersing a carrier generating agent, and spreading the resulting liquid.

BRIEF DESCRIPTION OF THE INVENTION

FIGS. 1, 2, 3, 4, 5 and 6 are cross-sectional views of different specific multi-layer arrangements of inventive electrophotographic light-sensitive elements.

DETAILED DESCRIPTION

[EXAMPLES 1 TO 10]

A solution was prepared by solving two parts, by weight, of butyral resin and 100 parts, by weight, of isopropyl alcohol. 5 parts, by weight, of ten kinds of bis-azo pigments listed below were ground into fine particles and dispersed in the solution to prepare three kinds of coating liquid. Each coating liquid was spread by a doctor blade on an Al plate of 50 μm thick by an amount providing 0.3 μm thick film when dried, and was thereafter dried to form the charge generating layer.

Subsequently, 5 parts, by weight, of a hydrazone compound shown by the following structural formula:

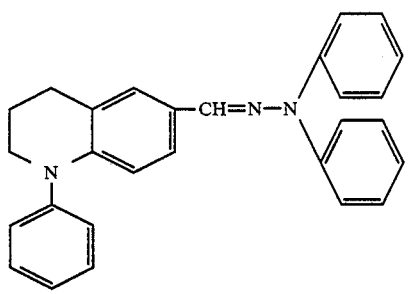

and 5 parts, by weight, of polyvinylcarbazole were solved in 70 parts, by weight, of monochlorobenzene, and the resulting solution was spread by a doctor blade on the charge generating layer up to a dried thickness of 20 μm, and was dried thereafter to form the charge transport layer.

The kinds of electrophotographic light-sensitive elements obtained in the foregoing processes were corona-charged with −6 KV under a static condition to study their dark decays for subsequent 5 seconds and study their light attenuations under exposure of 15 lux for 5 seconds, in order to determine their photoconductive characteristics, using an electrostatic charge testing apparatus (EPA-8100 type manufactured by Kawaguchi Electric Works Co., Ltd.) The resulting primary charge potential ($V_O$), sensitivity (E ½) and residual potential ($V_R$) are shown in Table 3.

TABLE 3

| Examples | bis-azo pigments compounds in Tables 1 & 2 | $V_O$(-V) | Sensitivity | $V_R$ |
|---|---|---|---|---|
| 1 | No. (2)-1 | 720 | ○ | 40 |
| 2 | No. (2)-5 | 720 | ○ | 60 |
| 3 | No. (2)-8 | 730 | ○ | 50 |
| 4 | No. (2)-11 | 710 | ○ | 40 |
| 5 | No. (2)-15 | 750 | Δ | 30 |
| 6 | No. (2)-20 | 760 | Δ | 20 |
| 7 | No. (2)-25 | 720 | ○ | 10 |
| 8 | No. (3)-5 | 710 | ○ | 40 |
| 9 | No. (3)-8 | 750 | × | 35 |
| 10 | No. (3)-12 | 740 | ○ | 50 | where in the column of sensitivity, ○ is good, Δ is normal, and X is bad.

As described above, since the invention uses a novel organic photoconductive compound shown by the general formula (1), it provides a photoconductive film having a high-sensitive element using the novel film. Therefore, the invention may be widely used throughout various fields of electrophotographic application such as electrophotographic machines, laser beam printers, LED printer, CRT printers, etc.

What is claimed is:

1. A photoconductive film comprising at least one kind of bis-azo pigment shown by the following general formula (1):

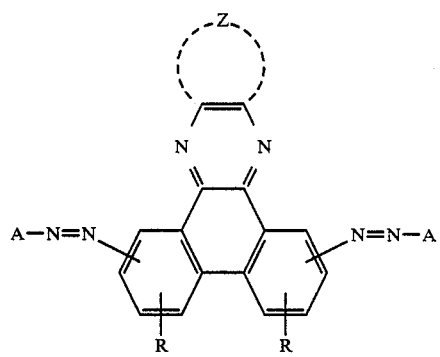

where R is a hydrogen atom, lower alkyl group, aryl radical, alkoxycarbonyl group, aryloxycarbonyl group, acyl group, halogen atom or monovalent organic residue; and

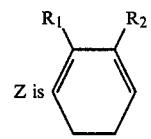

Z is where $R_1$ and/or $R_2$ are: H, Cl, CN, CH$_3$, CF$_3$, NO$_2$, OCH$_3$, N(CH$_3$)$_2$, C$_6$H$_6$,

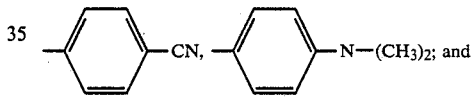

A is

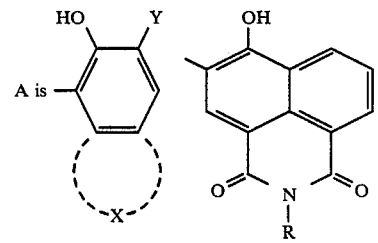

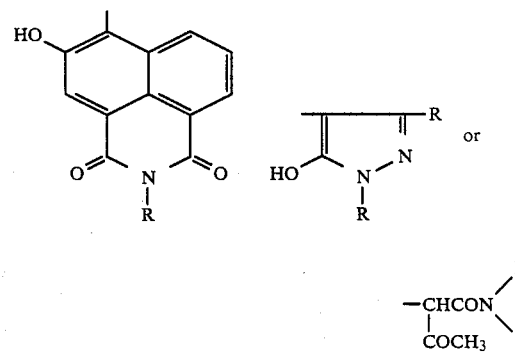

where R is a hydrogen atom, lower alkyl group, aryl radical, alkoxycarbonyl group, aryloxycarbonyl group, acyl group, halogen atom or monovalent organic residue; and Y is 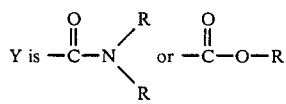

where R is the same as above; and

X is 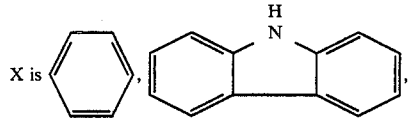

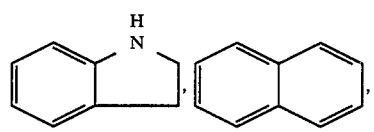

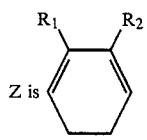

2. An electrophotographic light-sensitive element characterized in the use of a light-sensitive layer including a photoconductive film which comprises at least one kind of bis-azo pigment shown by the following general formula (1):

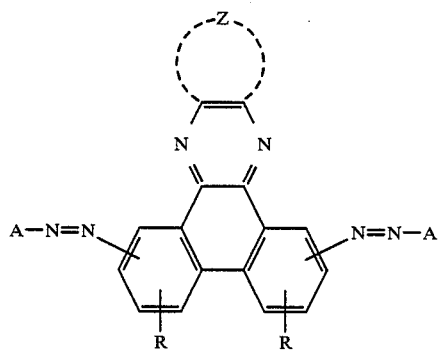 (1)

where R is hydrogen atom, lower alkyl group, aryl radical, alkoxycarbonyl group, aryloxycarbonyl group, acyl group, halogen atom, or monovalent organic residue; and Z is 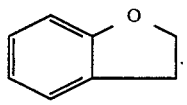

where $R_1$ and/or $R_2$ are: H, Cl, CN, $CH_3$, $CF_3$, $NO_2$, $OCH_3$, $N(CH_3)_2$, $C_6H_6$,

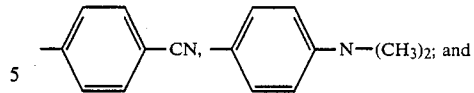

A is 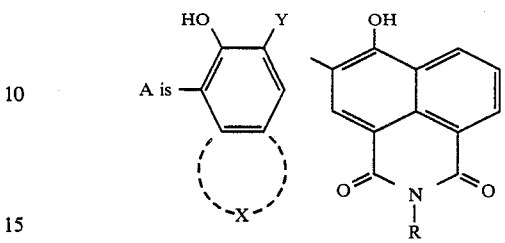

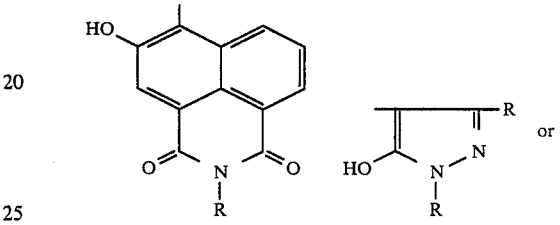

where R is a hydrogen atom, lower alkyl atom, aryl radical, alkoxycarbonyl group, aryloxycarbonyl group, acyl group, halogen atom or monovalent organic residue; and Y is 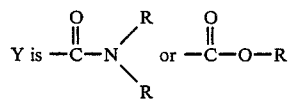

where R is the same as above; and

X is 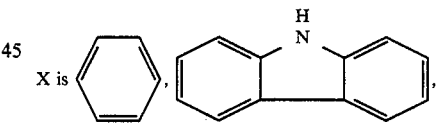

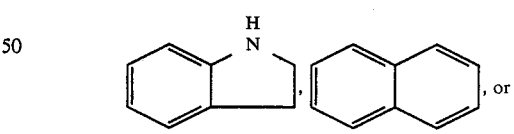

* * * * *